United States Patent
Bestetti et al.

(10) Patent No.: US 11,549,023 B2
(45) Date of Patent: Jan. 10, 2023

(54) PAINT FOR HIGH TEMPERATURE AND METHOD OF PREPARING THE PAINT

(71) Applicant: VERNICIATURE BRESCIANE S.R.L., Brescia (IT)

(72) Inventors: Massimiliano Bestetti, Brescia (IT); Gianluca Ghizzardi, Brescia (IT)

(73) Assignee: VERNICIATURE BRESCIANE S.R.L., Brescia (IT)

(*) Notice: Subject to any disclaimer, the term of this patent is extended or adjusted under 35 U.S.C. 154(b) by 307 days.

(21) Appl. No.: 16/954,907

(22) PCT Filed: Sep. 18, 2018

(86) PCT No.: PCT/IB2018/057173
§ 371 (c)(1),
(2) Date: Jun. 17, 2020

(87) PCT Pub. No.: WO2019/081995
PCT Pub. Date: May 2, 2019

(65) Prior Publication Data
US 2020/0377739 A1    Dec. 3, 2020

(30) Foreign Application Priority Data
Oct. 25, 2017    (IT) .......... 102017000121057

(51) Int. Cl.
| C09D 5/24 | (2006.01) |
| H01B 1/24 | (2006.01) |
| C09D 7/62 | (2018.01) |
| C08K 3/04 | (2006.01) |
| C09D 7/80 | (2018.01) |

(52) U.S. Cl.
CPC ............ C09D 5/24 (2013.01); C09D 7/62 (2018.01); H01B 1/24 (2013.01); *C08K 3/041* (2017.05); *C09D 7/80* (2018.01)

(58) Field of Classification Search
CPC ... H01B 1/04; H01B 1/12; H01B 1/20; H01B 1/24; C09D 5/24; B82Y 30/00; C08K 3/041
See application file for complete search history.

(56) References Cited

U.S. PATENT DOCUMENTS

2015/0101849 A1* 4/2015 Bockmeyer .......... H05K 3/1291
977/932

FOREIGN PATENT DOCUMENTS

| CN | 102977742 A | 3/2013 |
| CN | 104559759 A | 4/2015 |
| CN | 104903981 A | 9/2015 |
| CN | 105670394 A | 6/2016 |
| CN | 105925100 A | 9/2016 |
| CN | 106336759 A | 1/2017 |
| JP | 2006-306964 A | 11/2006 |

OTHER PUBLICATIONS

Chinese Office Action for Chinese Patent Application No. 201880083363.2 dated May 13, 2021, 9 pages.
"1-methoxy-2-propanol[propylene glycolmonomethyl ether]", Dow Polyethylene Glycol, Dow Chemical Co., 2 pages (1958).
International Search Report and Written Opinion of the International Searching Authority for corresponding International Patent Application No. PCT/IB2018/057173 dated Nov. 12, 2018, 7 pages.
International Preliminary Report on Patentability for corresponding International Patent Application No. PCT/IB2018/057173 dated Apr. 28, 2020, 5 pages.

* cited by examiner

*Primary Examiner* — Haidung D Nguyen
(74) *Attorney, Agent, or Firm* — Merchant & Gould P.C.

(57) ABSTRACT

An electrically conductive paint is for use at high temperatures. The paint includes conductive particles, such as carbon nanotubes or metal particles, and a silicone base.

3 Claims, No Drawings

PAINT FOR HIGH TEMPERATURE AND METHOD OF PREPARING THE PAINT

This application is a National Stage Application of PCT/IB2018/057173, filed 18 Sep. 2018, which claims the benefit of Ser. No. 102017000121057, filed 25 Oct. 2017 in Italy, and which applications are incorporated herein by reference. To the extent appropriate, a claim of priority is made to each of the above-disclosed applications.

FIELD OF THE INVENTION

The invention is in the field of paints for use at high temperatures. In particular, the invention refers to a paint for use at high temperatures, which is electrically conductive so as to be used as a vector of electrical current to the coated component for various purposes, mainly for heating the same component.

STATE OF THE ART

Generally, high temperature paints are used on a metallic substrate for the purpose of protecting the substrate from hot corrosion. The paint is therefore a barrier, the effectiveness of which depends on the ability of the same paint to deform due to the effect of thermal cycles without forming microcracks.

High temperature paints loaded with calcium and iron oxides, zinc phosphate, aluminum oxide, silicon nitride, manganese oxides, in order to take on a desired color, are known. The paint thus obtained does not have any features of electrical conductivity.

OBJECT OF THE INVENTION

The main object of the invention is to make available an electrically conductive, high-temperature paint. Such object is achieved by loading the paint with electrically conductive particles, such as multi-wall carbon nanotubes or single-wall carbon nanotubes, which are not functionalized or functionalized with covalent or non-covalent reactions.

DESCRIPTION OF THE INVENTION

A paint according to the invention comprises a silicone resin, preferably a polysiloxane, for example a silicone polyester or silicone epoxy resin.

Preferably, the solvent used is water or another organic solvent.

According to the invention, the paint is loaded with electrically conductive particles such as multi-wall or single-wall carbon nanotubes, functionalized or non-functionalized, graphene or oxidized graphene, metallic particles, such as copper or nickel, and combinations thereof.

According to a preferred embodiment, mixtures of carbon nanotubes and metallic particles are used.

Preferably, moreover, the paint contains dispersing agents suitable for keeping the particles in suspension, preventing their agglomeration, such as surfactants, gum arabic, serinol pyrrole.

Once the paint has been obtained and before application to the component, the conductive particles are preferably dispersed by dispersion processes, for example, mechanical, through the use of ultrasound or a paddle mixing system.

Preferably, the quantity of carbon nanotubes in the paint is between 0.1% and 40% by weight.

Preferably, the quantity of conductive particles in the paint is between 0.1% and 90% by weight.

Preferably, the paint is applied by roller, spray, glazing, screen printing or pad printing or by immersion.

Once applied, the paint is subjected to a drying process, for example, at room temperature for 10-15 minutes and then fired at 270-310° C. for 10-17 minutes in air.

Preferably, the final thickness of the paint is between 1 μm and 200 μm.

Preferably, the electrical surface conductivity of the painted layer is between 5Ω/sq and 1500Ω/sq.

Example 1

4 grams of methyl-hydroxyethyl cellulose are dispersed in 96 grams demineralized water (intermediate A).

25 grams of product A, 10 grams of demineralized water, 1 gram of aminomethyl propanol and 1 gram of 40% modified polyacrylate in water are mixed at room temperature for 5 minutes (intermediate B).

To intermediate B, 0.5 grams of a 50% alcoholic solution of a surfactant and 0.5 grams of anti-foaming agent (intermediate C) are added while stirring with a Cowles mixer for 5 minutes at room temperature.

To intermediate C are added 26 grams of demineralized water, 8 grams of 1-methoxy-2-propanol alcohol and 1 gram of butyl carbitol (intermediate D).

To intermediate D are added 15 grams of multi-wall carbon nanotubes functionalized with serinol pyrrole (8%) and mixed for 15 hours, keeping the temperature at 20° C. (intermediate E).

To the product E, 20% of silicone polyester resin is added to obtain the paint (product F).

The paint according to Example 1 is particularly suitable for coating metallic surfaces.

Example 2

As in Example 1, to the product E is added 2-5% adhesion promoter (product G).

The paint according to Example 2 is particularly suitable for coating glass surfaces, such as glass-ceramics.

—o—

Innovatively, the paint described above achieves its intended object, as it resists high temperatures, i.e. around 700-800° C., and at least 500° C. for 24 hours, and is electrically conductive.

This allows the application to the component towards which one wishes to carry an electric current, generally for heating the same component.

For example, the paint according to the present invention is applicable to a cooktop with a base made of metallic or glass-ceramic material, to a heat exchanger, a radiator, a reactor.

It is clear that one skilled in the art, in order to meet contingent needs, may make changes to the method or to the paint or film or sheath or component described above, all contained within the scope of protection defined by the following claims.

The invention claimed is:

1. A method of preparing an electrically conductive paint, comprising the steps of:
   A) dispersing methyl-hydroxyethyl cellulose in demineralized water (intermediate A);
   B) mixing intermediate A) with aminomethyl propanol and polyacrylate (intermediate B);
   C) adding to intermediate B) an alcoholic solution of a surfactant and an anti-foaming agent (intermediate C);
   D) adding to intermediate C) 1-methoxy 2-propanol alcohol and butyl carbitol (intermediate D);

E) adding to intermediate D) single wall carbon nanotubes or multi-wall carbon nanotubes, either functionalized or non-functionalized, and mixing (intermediate E);

F) adding to intermediate E) silicone polyester resin (product F).

2. The method according to claim 1, comprising the further step:

G) adding to product F) an adhesion promoter (product G).

3. Paint obtained by the method according to claim 1.

* * * * *